May 13, 1930.  A. L. LEE  1,758,160
FISHING LURE
Filed Jan. 29, 1929
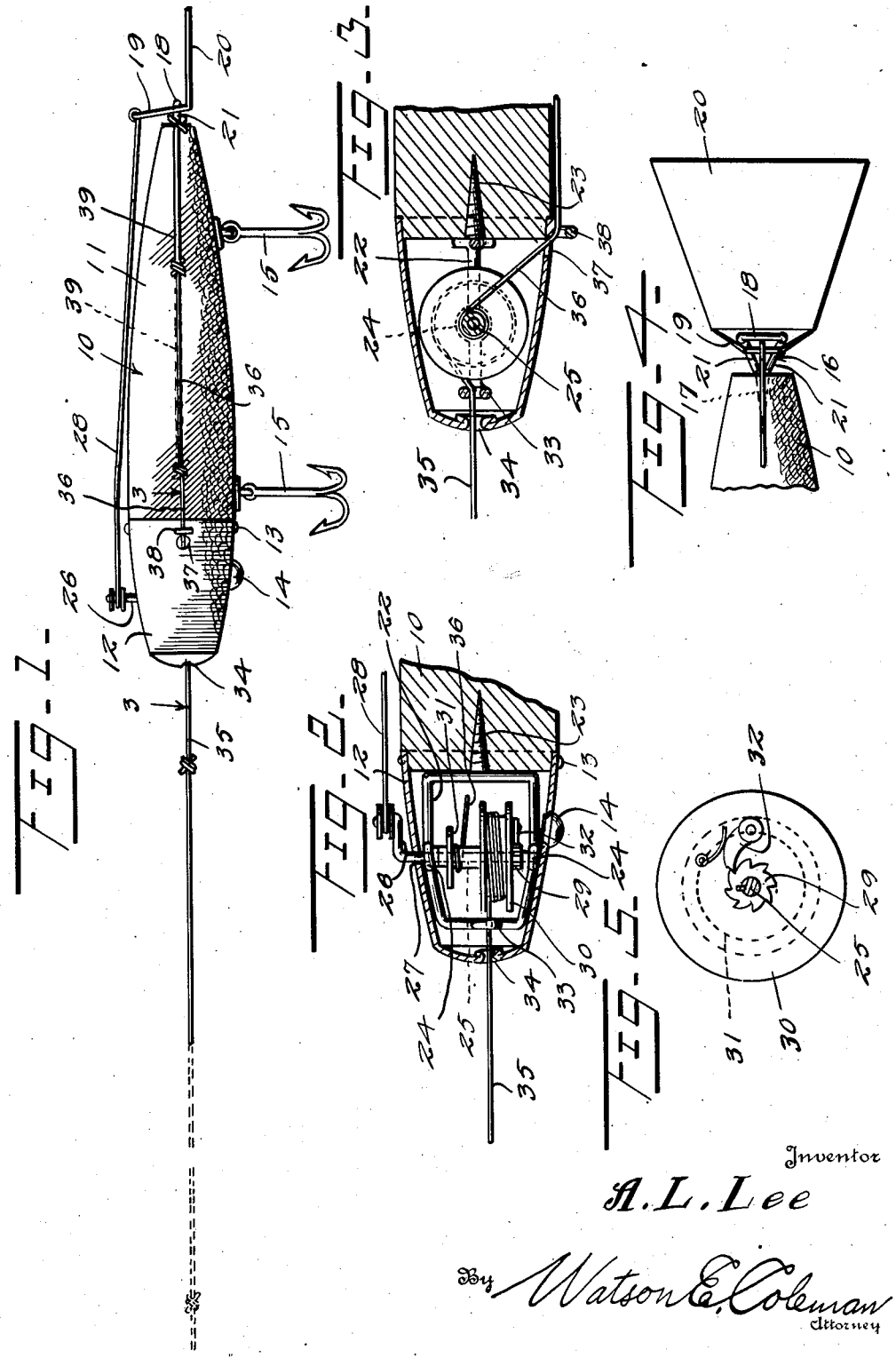
Inventor
A. L. Lee
By Watson E. Coleman
Attorney Patented May 13, 1930

1,758,160

UNITED STATES PATENT OFFICE

AMMIE L. LEE, OF PANAMA CITY, FLORIDA

FISHING LURE

Application filed January 29, 1929. Serial No. 335,869.

This invention relates to fishing lures, and more particularly to fishing lures of the plug type.

An important object of the invention is to provide in a device of this character a construction such that movement of the lure or a part thereof is provided during those periods when the lure ordinarily remains quiescent as, for example, when the lure has just landed after a casting operation or between retrieving periods.

A further and more specific object of the invention is to provide a lure having a body in the semblance of a fish lying upon its side and including a movable tail element, a means for operating said tail element, and a means for applying power to said operating means receiving and storing this power during casting periods or periods when the lure is being retrieved.

A further object of the invention is to provide a device of this character in which the only portion of the mechanism employed which is subject to rapid wear or deterioration which would render the lure inoperative in its motion producing functions is so located that it may be readily replaced and may be substituted for by a product readily and cheaply procurable at practically any drug store.

These and other objects I attain by the construction shown in the accompanying drawing, wherein for the purpose of illustration is shown a preferred embodiment of my invention and wherein:—

Figure 1 is a side elevation of a fishing lure constructed in accordance with my invention;

Figure 2 is a vertical sectional view through the head end of the lure;

Figure 3 is a horizontal sectional view through the head end of the lure;

Figure 4 is a top plan view of the tail mounting; and

Figure 5 is a detail sectional view showing the pawl and ratchet connection between the motor and shaft.

Referring now more particularly to the drawing, the numeral 10 generally designates an ichthyoidal body including a solid main body portion 11 and a hollow front or head portion 12 detachably secured to the main body portion 11 at 13. The hollow head portion 12 is provided at its under side with an eye 14 and the head portion and body are suitably colored, so that they resemble a minnow lying upon its side. The body portion 10 has at its under side hooks 15 which tend to maintain it in the proper position and the rear end portion of the body section 11 has secured thereto a triangular bracket 16 which has at an apex thereof a screw 17 or other fastening element adapted to enter the body portion. The side 18 opposing this apex forms a pivot bar abutting the outer face of an angular flange 19 formed upon a tail section 20, the arms 21 of the bracket adjoining this side being extended through openings formed in this flange.

Since these arms converge toward the body in their passage through the tail flange, they not only connect the tail to the body but likewise coact with this flange to limit oscillatory movements of the tail. Secured to the forward end of the body section 11 is a supporting frame 22. This frame as at present disclosed is rectangular in form and as having upon one of the insides thereof an outwardly projecting screw 23 to enter the end of the body. The sides of the frame have opposed bearings 24 within which are rotatably mounted a shaft 25. This shaft has a crank 26 extending through an opening 27 formed in the hollow head section to the exterior of this hollow head section and is there connected with the free end of the flange 19 of the tail by a link 28.

Between the arms of the frame, this shaft has secured thereto a ratchet gear 29 and rotatably mounted upon the shaft between this ratchet hub and the other of the arms is a double reel, the elements of which are indicated at 30 and 31 respectively and are secured to one another. The end wall of this reel element adjacent the ratchet gear has a spring-pressed pawl for coaction therewith, as indicated at 32. The outer end member of the frame is provided with an eye 33 aligning with one of these reels and the wall of the head structure has an opening 34 coinciding with this eye. A line element 35 is secured to the drum element 30 and wound thereon and then passed through the eye 33 and opening 34. A second line element 36 is oppositely wound upon the drum element 31 passes through a notch 37 formed in the inner end of the hollow head element 12 and a guiding eye 38 and has secured thereto an elastic 39.

This elastic preferably comprises an ordinary rubber band and is secured at its free end in the bracket 16 in such manner that it constantly exercises a pull upon the line element 36. Since the pull exercised by this elastic element rotates the drum assembly in a direction unwinding the cable 36 therefrom and winding the cable 35 thereon, it will be obvious that normally the cable will be wound upon the drum element 30 and unwound from the drum element 31. When the plug is cast, the pull of the casting force will cause the cable 35, which is connected to the casting line, to unwind, so that the cable 36 is wound upon the drum and the elastic element tensioned. When the plug lands, the pull of the casting force is relieved, so that the elastic element may then act to rotate the drum assembly in the opposite direction, winding the cable 35 thereon and withdrawing the cable 36 therefrom. At this time, the pawl 32 operatively engages the ratchet gear 29, so that the shaft 25 is rotated and by its rotation causes oscillatory movements of the tail element.

It will be obvious that the only portion of the apparatus which is subject to much strain is the elastic element and that this elastic element may be readily substituted in event it should break. Furthermore, since the bracket acts as a holding means preventing the tail element 20 from oscillating to too great an extent, even though this elastic element be broken and the tail operating functions of the plug thus destroyed, its operation as an ordinary plug is not in any way interfered with.

Since the construction hereinbefore set forth is capable of a certain range of change and modification without materially departing from the spirit of the invention, I do not limit myself to such specific structure except as hereinafter claimed.

I claim:—

1. In a casting lure, a body having a movable tail, a mechanical motor, operating connections between the motor and said tail, a casting line having connections with said motor winding the motor when strain is exerted tending to separate the line and lure, the connections between said tail and motor including a shaft with which the tail is connected, and a ratchet connection between the motor and the shaft operating the shaft when the motor is in self-induced operation and disconnecting the shaft from the motor during the winding operation.

2. In a casting lure, a body having a movable tail, a mechanical motor comprising a rotatable drum element and tension means normally maintaining the drum element in one position and returning the motor to such position when rotated therefrom, a driving connection between said motor and said tail, a casting line secured to and wound about the drum element whereby when the lure is cast the strain placed upon the line by the lure causes said drum element to rotate and thereby wind the motor, the driving connection between the motor and tail comprising a crank shaft driven by the drum element during operation thereof by said tension means, and a link connecting the crank of said shaft and said tail.

3. In a casting lure, a body having a movable tail, a mechanical motor comprising a rotatable drum element and tension means normally maintaining the drum element in one position and returning the motor to such position when rotated therefrom, a driving connection between said motor and said tail, a casting line secured to and wound about the drum element whereby when the lure is cast the strain placed upon the line by the lure causes said drum element to rotate and thereby wind the motor, means rendering the connection between the tail and motor inoperative during winding of the motor, the driving connections between the motor and tail comprising a crank shaft driven by the drum element during operation thereof by said tension means, and a link connecting the crank of said shaft and said tail.

4. In a casting lure, a body having a movable tail, a drum rotatably mounted within the body, tension means normally maintaining the drum in one position and returning it to such position when rotated therefrom, a driving connection between the drum and tail, a casting line secured to and wound about the drum and adapted when the lure is cast to rotate the drum from said position, and means rendering the driving connection between the drum and tail inoperative during the turning of the drum by the casting line.

In testimony whereof I hereunto affix my signature.

AMMIE L. LEE.